(12) United States Patent
Stanley, Jr.

(10) Patent No.: US 10,668,952 B1
(45) Date of Patent: Jun. 2, 2020

(54) LAWN CARE TRAILER SYSTEM

(71) Applicant: Phillip P. Stanley, Jr., Inez, TX (US)

(72) Inventor: Phillip P. Stanley, Jr., Inez, TX (US)

( * ) Notice: Subject to any disclaimer, the term of this patent is extended or adjusted under 35 U.S.C. 154(b) by 27 days.

(21) Appl. No.: 16/134,872

(22) Filed: Sep. 18, 2018

(51) Int. Cl.
*B62D 21/03* (2006.01)
*B62D 63/08* (2006.01)
*A01B 45/02* (2006.01)
*B62D 63/06* (2006.01)

(52) U.S. Cl.
CPC .............. *B62D 21/03* (2013.01); *A01B 45/02* (2013.01); *B62D 63/064* (2013.01); *B62D 63/08* (2013.01)

(58) Field of Classification Search
CPC ...... B62D 21/03; B62D 63/064; B62D 63/08; A01B 45/02
USPC .......................................................... 172/21
See application file for complete search history.

(56) References Cited

U.S. PATENT DOCUMENTS

| | | | | |
|---|---|---|---|---|
| 1,806,889 A | * | 5/1931 | Businga | B62D 63/08 280/99 |
| 1,895,217 A | * | 1/1933 | Van Vorst | B44D 3/24 242/129.6 |
| 2,876,036 A | * | 3/1959 | Olson | B62D 63/064 296/26.1 |
| 3,520,551 A | * | 7/1970 | Sellers | B60P 3/32 280/795 |
| 3,556,561 A | * | 1/1971 | Gingue | B62D 7/02 280/489 |
| 3,589,748 A | * | 6/1971 | Miller | B60S 9/10 280/765.1 |
| 3,797,850 A | * | 3/1974 | Stout et al. | B62D 63/08 280/789 |
| 3,921,742 A | | 11/1975 | May et al. | |
| 4,078,626 A | | 3/1978 | Weichel | |
| 4,436,040 A | | 3/1984 | Chumley | |
| 6,557,882 B2 | | 5/2003 | Harrington | |
| 8,708,085 B1 | * | 4/2014 | Wilson | B62D 63/064 180/209 |
| 2003/0222431 A1 | | 12/2003 | Crosby et al. | |

FOREIGN PATENT DOCUMENTS

| | | | | |
|---|---|---|---|---|
| GB | 723787 A | * | 2/1955 | ............. B60D 1/486 |
| GB | 1509847 A | * | 5/1978 | ........... B60G 11/225 |

* cited by examiner

*Primary Examiner* — Tara Mayo-Pinnock
(74) *Attorney, Agent, or Firm* — Suzanne Kikel, Patent Agent

(57) ABSTRACT

A lawn care trailer system that is versatile, that is easily assembled and disassembled, and that is easily controlled during use. The system is supported by wheels and has a frame assembly with spaced apart longitudinal bars and a plurality of transverse bars to form a rectangular platform for supporting a mounting assembly for supporting storage containers and tools; or a box shape support assembly; or a flat-screened bed assembly. Tubular members of the frame assembly attach one or more roller units thereto and a tow bar assembly attaches the frame assembly to a tractor or lawnmower. The frame assembly supports various components making the lawn care trailer system suitable for spring, summer, and/or fall operations.

15 Claims, 6 Drawing Sheets

LAWN CARE TRAILER SYSTEM

BACKGROUND OF THE INVENTION

1. Field of the Invention

The present invention relates to general purpose utility trailers, and more particularly, to a lawn care trailer system that is designed for multiple uses, such as landscaping, grass mowing, aerating, shredding, chipping, mulching, yard rolling, and fertilizing.

2. Brief Description of the Prior Art

There are many types of utility trailers. Some are general purpose trailers designed for carrying cargo of various kinds. Such trailers typically have a box configuration, much like the bed of a pickup truck. There are also specialized trailers for towing sport and recreational vehicles, such as motorcycles, snowmobiles, and all-terrain vehicles (ATV's). Many of these are basic flatbed trailers that may also include stake pockets and hold-down hardware. While some types of general cargo may be carried by either a box trailer or by a flatbed trailer, most flat-bed trailers cannot be used for many types of cargo. For example, sand, gravel, and other bulk granular materials cannot be effectively carried on a flatbed trailer. On the other hand, snowmobiles cannot generally be disposed transversely in the bed of a box trailer. Carrying in this manner requires a flatbed without sides.

There is a need in the art for a trailer that is reconfigurable as both a box trailer that can be towed behind a powered vehicle and as a flatbed trailer for carrying the powered vehicle for towing behind another vehicle. The trailer includes front, side, and rear panels that fold down from an upright position to the flatbed configuration.

In landscaping and establishing a new lawn in areas, such as around newly constructed residential or commercial buildings, it is the normal practice, after initial bulldozer clearing of the trees on the land, to plow, level, scarify, rake and pulverize the soil, and to remove trash, rocks and other debris from the area before seeding. Thereafter, the landscaped ground is fertilized, seeded and smoothed. Presently, it is necessary to use multiple pieces of equipment and/or attachments, which are either self-propelled or which must be connected to and disconnected from a prime mover, such as a tractor, in performing at least certain of the sequential operations mentioned above. For example, after initial bulldozer operations, it is the present-day practice to backfill relatively large depressions left by the bulldozer where trees have been removed, to plow the ground to a desired depth to break up the soil, to level, rake and scarify the soil, and to pulverize large clods of soil to maintain a uniform texture to the soil. Prior to seeding, the trash and the debris must be collected and removed from the area to be seeded, generally necessitating the use of a front end loader to remove the same.

Although the prior art includes various forms of trailers that can be used in landscaping operations, such as land grading, or in a seeding operation, it is believed that none of the present-day apparatuses can perform all operations necessary for landscaping, fertilizing and seeding of a lawn area. Also, many of the present-day apparatuses are bulky and difficult to handle, thereby limiting their use in relatively large open areas, and they are not suitable for use in narrow areas around buildings and/or between concrete driveways and trees.

All known motorized agricultural machines, in general, have the drawback that they are unsuitable for operations involved in working the soil, fertilization, tillage, cultivation, insect control, and harvesting for all the usual crops in farming units, so that not only the usual tractors but also special appliance carriers, for example, for tillage and cultivation must be used, and these generally are not suitable for fertilization, still less for harvesting operations.

Special harvesting machines such as field choppers, pick-up presses, loading vehicles, beet harvesting machines, potato harvesters and transport vehicles are not suitable for working the soil, tillage, fertilization and cultivation. Manure spreaders designed for spreading farmyard manure and liquid manure are not suitable for the transportation of crops, still less for working the soil or for the care of field crops. The mechanization of agriculture, with numerous machines of various kinds and with many categories of vehicles necessitates considerable capital which average size agricultural concerns are unable to invest. The trailers or attachment appliances hitherto known call for powerful tractors and are becoming heavier, so that the continually more powerful tractors can be adequately utilized. This increasingly mechanized field cultivation causes more and more serious damage to the soil as a result of the pressure by heavy vehicles exerted thereon. The lower yields, caused by the deterioration in the biological quality of the soils, cannot be counteracted even by the use of larger quantities of water-soluble manures and toxic weed-killers, pesticides and the like except at the price of a worsening of the quality of the products.

Known farm tractors with steered front wheels of comparatively small size and with very large rear wheels suffer from the additional drawback that working appliances can be built on them only in front of the front axle or behind the rear axle. Their comparatively narrow and frequently varying angle also results, in the case of many agricultural tasks, in numerous ground tracks made by the tractor and by the various working machines and often situated side by side.

There is a need in the art to provide a lawn care trailer system that eliminates many or all of the drawbacks associated with the present-day vehicles and/or trailers and to provide a motorized agricultural machine to which all known working, harvesting, transporting and conveying appliances can be attached without detracting from its running properties, steerability, ability to negotiate uneven ground or safety on slopes, and which will only produce moderate pressure on the soil and a minimum number of tracks, thus being eminently suitable for all operations involved in working the soil and fertilization, tillage, cultivation, harvesting and transport in connection with all the usual types of field crop.

There is a further need in the art to provide, in agriculture, a motor vehicle system which is economically able to work large areas by means of implements mounted on the rear and front end of the vehicle, and also to be able by means of the same vehicle to carry out transporting and loading operations in a manner which is economical and which requires the minimum effort on the part of the driver.

It is therefore an object of the present invention to provide a multi-purpose lawn landscaping and seeding vehicle for attachment to and operation from a prime mover, such as a garden tractor, which is compact and relatively lightweight construction, and which can be utilized to perform, with a single piece of equipment, all of the necessary functions for normal landscaping and seeding of a lawn.

It is a further object of the invention to provide a vehicle which may be easily transported to a landscaping site and readily manipulated in confined or small areas of the site to perform all the necessary operations required.

It is still a further object of the invention to provide a multi-purpose lawn landscaping and seeding vehicle which permits plowing, scarifying, raking, fertilizing, seeding and pulverizing and which device may also be used for scraping, leveling and backfilling of the ground, as well as for the removal of trash, rocks and other debris from the site.

SUMMARY OF THE INVENTION

The present invention provides an agricultural care system, specifically a lawn care trailer system that is versatile, easily assembled and disassembled and easily controlled during use. The lawn care trailer system of the invention provides a basic frame assembly or common cart (trailer) and locators which allow an operator to combine various lawn care jobs into one single one. The lawn care trailer system of the invention comprises at least two spaced-apart wheels, an axle connecting the two spaced-apart wheels, and a wheel cover associated with each of the two spaced-apart wheels and a frame assembly supported by the wheels. The frame assembly comprises a first end, a second end, a first side, a second side, a longitudinal axis extending between the first end and the second end, a transverse axis extending between the first side and the second side, a first plane which is a top plane when the frame assembly is in use, and a second plane which is a bottom plane when the frame assembly is in use. A first longitudinal bar extends in the direction of the longitudinal axis from the first end of the frame assembly to the second end of the frame assembly, and a second longitudinal bar extends in the direction of the longitudinal axis from the first end of the frame assembly to the second end of the frame assembly. The first and second longitudinal bars are spaced apart from each other in the direction of the transverse axis, are adjacent to a wheel, and define a side of the frame assembly.

The frame assembly further comprises a first transverse bar located adjacent to the first end of the frame assembly and extending in the direction of the transverse axis of the frame assembly and beyond the longitudinal bars. This first transverse bar has a first end located adjacent to the first longitudinal bar; a second end located adjacent to the second longitudinal bar; a first tubular member on the first end of the first transverse bar; a second tubular member on the second end of the first transverse bar; and a third tubular member on the first transverse bar between the first and second longitudinal bars. The tubular members on the first transverse bar extend between the first plane and the second plane of the frame assembly.

The frame assembly further comprises a second transverse bar located adjacent to the second end of the frame assembly and extending in the direction of the transverse axis of the frame assembly and beyond the longitudinal bars. This second transverse bar has a first end located adjacent to the first longitudinal bar; a second end located adjacent to the second longitudinal bar; a first tubular member on the first end of the second transverse bar; a second tubular member on the second end of the second transverse bar; and a third tubular member on the second transverse bar between the first and second longitudinal bars. The tubular members on the second transverse bar extend between the first plane and the second plane of the frame assembly.

The frame assembly further comprises a third transverse bar extending in the direction of the transverse axis of the frame assembly and located between the first and second transverse bars. This third transverse bar has a first end fixed to the first longitudinal bar; a second end fixed to the second longitudinal bar; and a tubular member located between the first end of the third transverse bar and the second end of the third transverse bar. The tubular member on the third transverse bar extends between the first plane and the second plane of frame assembly.

The frame assembly further comprises a fourth transverse bar extending in the direction of the transverse axis of the frame assembly and located beneath the second transverse bar. This fourth transverse bar has a first end connected to the second transverse bar; a second end connected to the second transverse bar; and a first tubular member located between the first end of the fourth transverse bar and the second end of the fourth transverse bar. This first tubular member on the fourth transverse bar extends in the direction of the longitudinal axis.

A tow bar extends in the direction of the longitudinal axis of the frame assembly and has a first end connected to the first transverse bar, a second end spaced away from the first transverse bar, and a tubular member on the tow bar. This tubular member on the tow bar extends between the first plane and the second plane of the frame assembly.

The lawn care trailer system of the invention allows a person to use the basic frame assembly described herein above in combination with a large mower to aerate a lawn, spread seed and fertilizer, and/or roll the yard all in the same pass. The basic frame assembly of the invention can also be used in combination with a lawnmower to cut grass simultaneously with other tasks. The basic frame assembly permits the overall system to be quickly converted to other uses, such as converting from a seeding application to a shredder and mulching option. Still further, a chipper can be added as well as a mulch collector.

The system embodying the present invention reduces the overall investment by lawn care companies in equipment. It allows for a reduction in manpower, as well as an increase in efficiency while maintaining large properties and public sports areas, such as football and baseball fields, as well as public parks.

The lawn care trailer system of the invention is versatile, easily assembled and disassembled and easily controlled during use. The system is supported by wheels and has a frame assembly with spaced apart longitudinal bars and a plurality of transverse bars to form a rectangular platform for supporting a mounting assembly for supporting storage containers and tools; or a box shape support assembly; or a flat-screened bed assembly. Tubular members of the frame assembly attach one or more rollers thereto and a tow bar assembly attaches the frame assembly to a tractor or lawnmower. The frame assembly supports various components of the lawn care trailer system making the system suitable for spring, summer or fall operations.

These and other features and advantages of the prevent invention will be better appreciated and understood when the following description is read along with the accompanying drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
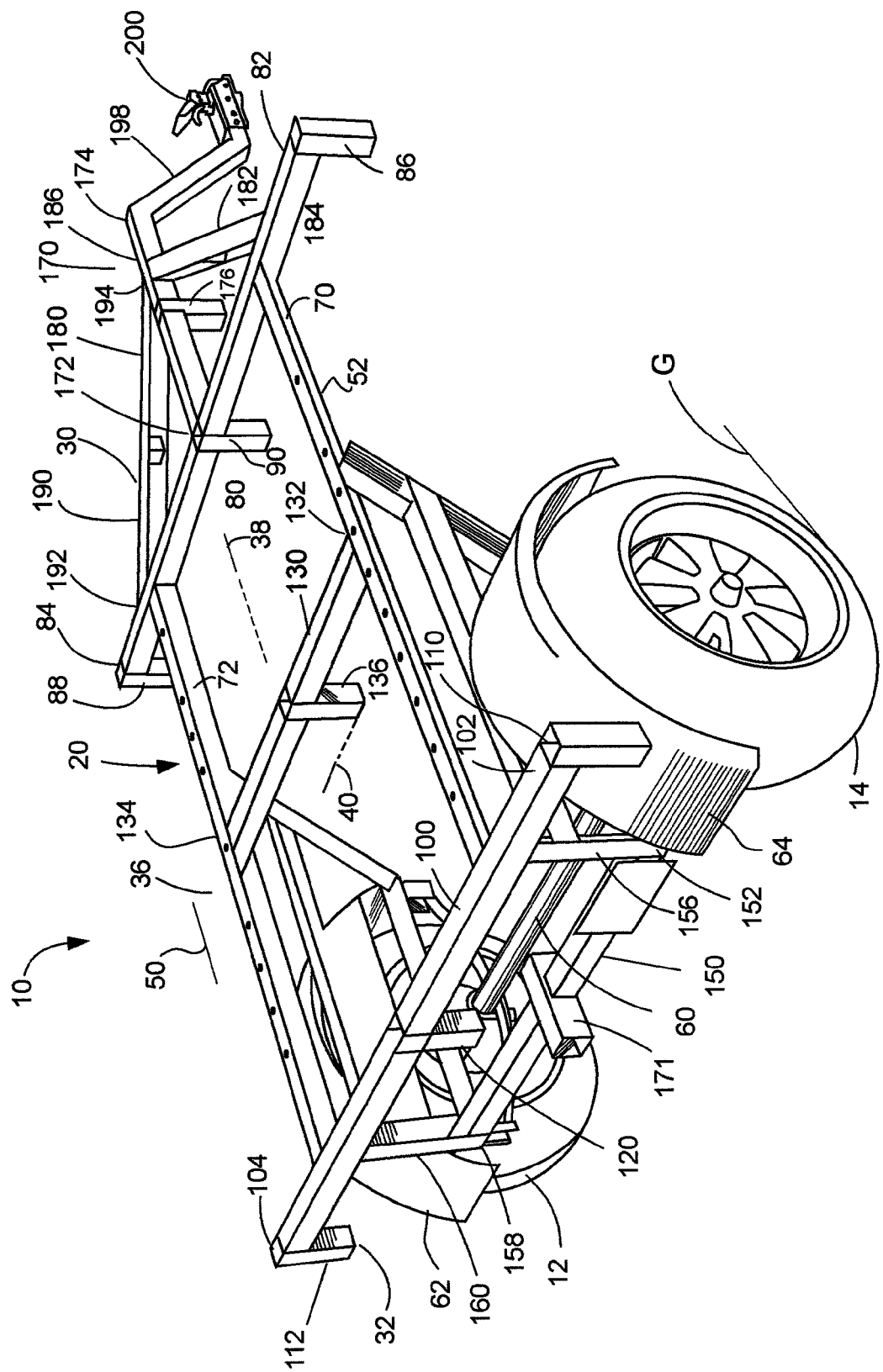
FIG. 1 is a perspective view of a lawn care trailer system of the present invention illustrating a basic frame assembly of the trailer system of the invention.

Referring first to FIG. 1, the present invention is embodied in a lawn care trailer system 10 supported by two wheels 12 and 14 and which supports and transports a frame assembly 20. Frame assembly 20 forms the base for all embodiments and variations of lawn care trailer system 10, and permits the lawn care trailer system 10 to be versatile. The lawn care trailer system 10 will be described in relation to a lawn care system, and it is being described herein for purposes of economy of description. No limitation is intended, as this lawn care trailer system 10 may be used for many purposes in addition to lawn care as will become apparent to those skilled in the art. The term "lawn" is intended to be interpreted broadly enough to cover all forms of care suitable for the lawn care trailer system 10 taught by this disclosure. These additional applications are intended to be covered by the disclosure and the appended claims.

Frame assembly 20 includes a first end 30; a second end 32; a first side 34; a second side 36; a longitudinal axis 38 (shown by dash-dot lines) which extends between first end 30 and second end 32; a transverse axis 40 (shown by dash-dot lines) which extends between first side 34 and second side 36; a first plane 50 (shown by short line to the top left of FIG. 1) which is a top plane when the frame assembly unit is in use; and a second plane 52 (shown by a short line to the right of FIG. 1) which is a bottom plane when the frame assembly 20 is in use. Frame assembly 20 further includes an axle 60 connecting the two wheels 12, 14 together, and two wheel covers 62 and 64, each cover being associated with a wheel. Frame assembly 20 is shown in FIG. 1 in a use position supported by ground G.

Still referring to FIG. 1, frame assembly 20 further includes a first longitudinal bar 70 extending in the direction of the longitudinal axis 38 from the first end 30 to the second end 32 of the frame assembly, and a second longitudinal bar 72 extending in the direction of the longitudinal axis 38 from the first end 30 of the frame assembly to the second end 32 of the frame assembly 20. The first and second longitudinal bars 70, 72 are spaced apart from each other in the direction of the transverse axis 40. Each longitudinal bar 70, 72 is located adjacent to a wheel 12, 14 and defines an associated side of frame assembly 20.

Referring specifically to the upper right hand portion of FIG. 1, frame assembly 20 comprises a first transverse bar 80. First transverse bar 80 is located adjacent to first end 30 of frame assembly 20 and extends in the direction of the transverse axis 40 of the frame assembly and beyond the two spaced-apart longitudinal bars 70, 72. First transverse bar 80 has a first end 82 located adjacent to first longitudinal bar 70; a second end 84 located adjacent to second longitudinal bar 72; a first tubular member 86 on first end 82 of first transverse bar 80; a second tubular member 88 on the second end 84 of first transverse bar 80; and a third tubular member 90 on the first transverse bar 80 between the first and second longitudinal bars 70, 72, respectively. Tubular members 86, 88, and 90 on the first transverse bar 80 extend between first and second planes 50, 52 of frame assembly 20 and are oriented essentially perpendicularly to the ground G.

Referring specifically to the lower left hand portion of FIG. 1, frame assembly 20 further comprises a second transverse bar 100. Second transverse bar 100 is located adjacent to second end 32 of frame assembly 20 and extends in the direction of the transverse axis 40 of frame assembly 20 and beyond the two spaced-apart longitudinal bars 70, 72. Second transverse bar 100 has a first end 102 located adjacent to first longitudinal bar 70; a second end 104 located adjacent to second longitudinal bar 72; a first tubular member 110 on first end 102 of second transverse bar 100; a second tubular member 112 on second end 104 of second transverse bar 100; and a third tubular member 120 on second transverse bar 100 which is positioned between the first and second longitudinal bars 70, 72. Tubular members 110, 112 and 120 on second transverse bar 100 are oriented to extend between the first and second planes 50, 52 of frame assembly 20. Tubular members 110, 112, and 110 are oriented essentially perpendicularly to the surface of ground G, on which the frame assembly 20 is supported during use thereof.

Referring specifically to the center of frame assembly 20 in FIG. 1, frame assembly 20 further comprises a third transverse bar 130 extending in the direction of the transverse axis 40 of frame assembly 20 and located between the first and second transverse bars 80, 100. Third transverse bar 130 has a first end 132 fixed to first longitudinal bar 70; a second end 134 fixed to second longitudinal bar 72; and a tubular member 136 located between first end 132 and second end 134 of third transverse bar 130. Tubular member 136 of third transverse bar 130 extends between the first and second planes 50, 52 of frame assembly 20, and is oriented essentially perpendicularly to the surface of ground G on which the frame assembly 20 is supported during use of trailer system 10.

Referring again to the lower left hand portion of FIG. 1, frame assembly 20 further comprises a fourth transverse bar 150 extending in the direction of the transverse axis 40 of frame assembly 20, and is located below second transverse bar 100. Fourth transverse bar 150 has a first end 152, which is connected to second transverse bar 100 by a strut 156 extending from first plane 50 toward second plane 52; a second end 158 connected to second transverse bar 100 by a strut 160; and a first tubular member 171 located between the first and second ends 152, 158 of fourth transverse bar 150. First tubular member 171 of fourth transverse bar 150 extends in the direction of the longitudinal axis 38 of frame assembly 20.

Referring again to the upper right hand portion of FIG. 1, frame assembly 20 further comprises a tow bar 170. Tow bar 170 is located on front or on the first end 30 of frame assembly 20, and extends in the direction of the longitudinal axis 38 of frame assembly 20. Tow bar 170 has a first end 172 connected to first transverse bar 80, and a second end 174 spaced away from first transverse bar 80. A tubular member 176 is located below tow bar 170 and extends between the first and second planes 50, 52 of frame assembly 20. Tubular member 176 is oriented essentially perpendicularly to the ground G which supports frame assembly 20 when vehicle system 10 is in use.

Still referring to the upper right hand portion of FIG. 1, frame assembly 20 further includes a tow bar support frame assembly 180. Tow bar support frame assembly 180 includes a first support bar 182 having a first end 184 connected to first transverse bar 80 and a second end 186 connected to tow bar 170. Tow bar support frame assembly 180 further includes a second support bar 190 which has a first end 192 connected to first transverse bar 80 of frame assembly 20, and a second end 194 connected to tow bar 170. A support bar 198 is attached to and extends downwardly from tow bar 170, and a connection member 200 extends outwardly from support bar 198. Connection member 200 is used to attach frame assembly 20 to a towing motorized vehicle (not shown), such as a tractor, a lawnmower, or the like.

Figure 2:
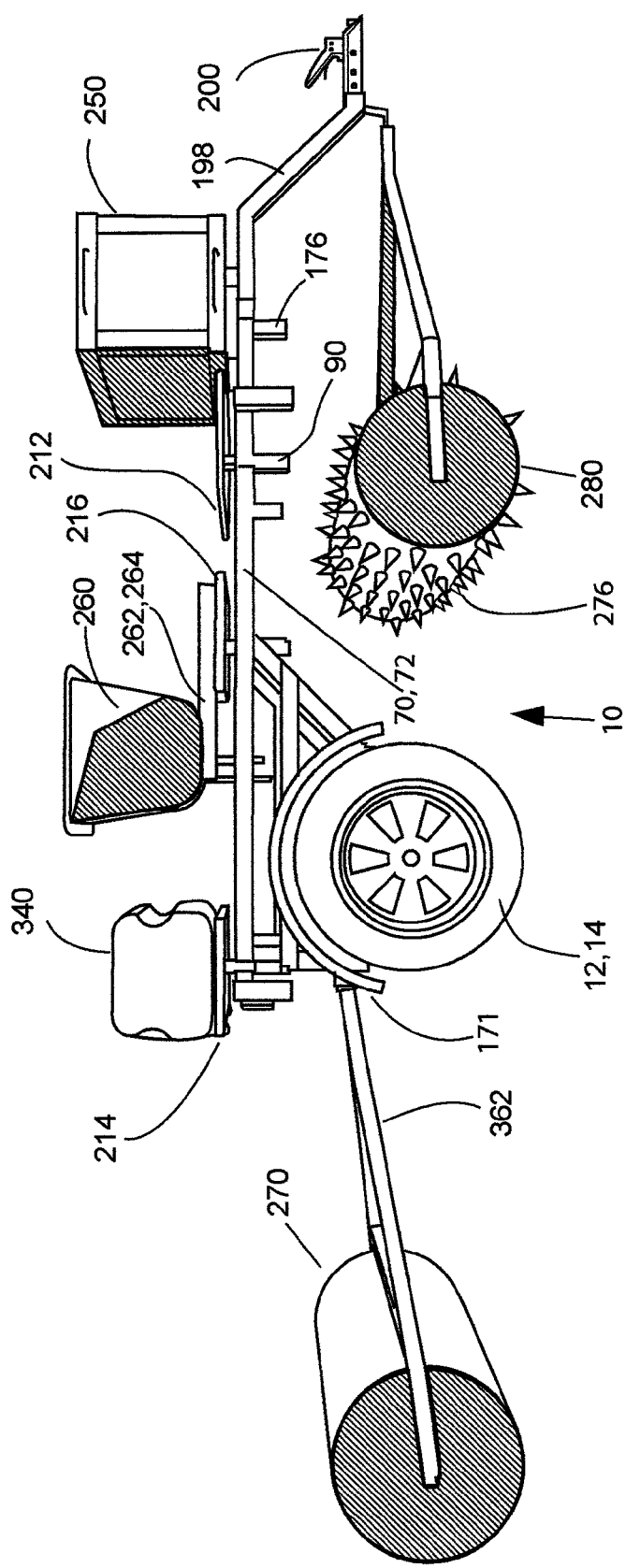
FIG. 2 is a perspective side view of the lawn care trailer system of the invention illustrating components which may be carried by the frame assembly of the trailer system of the invention.
Figure 3:
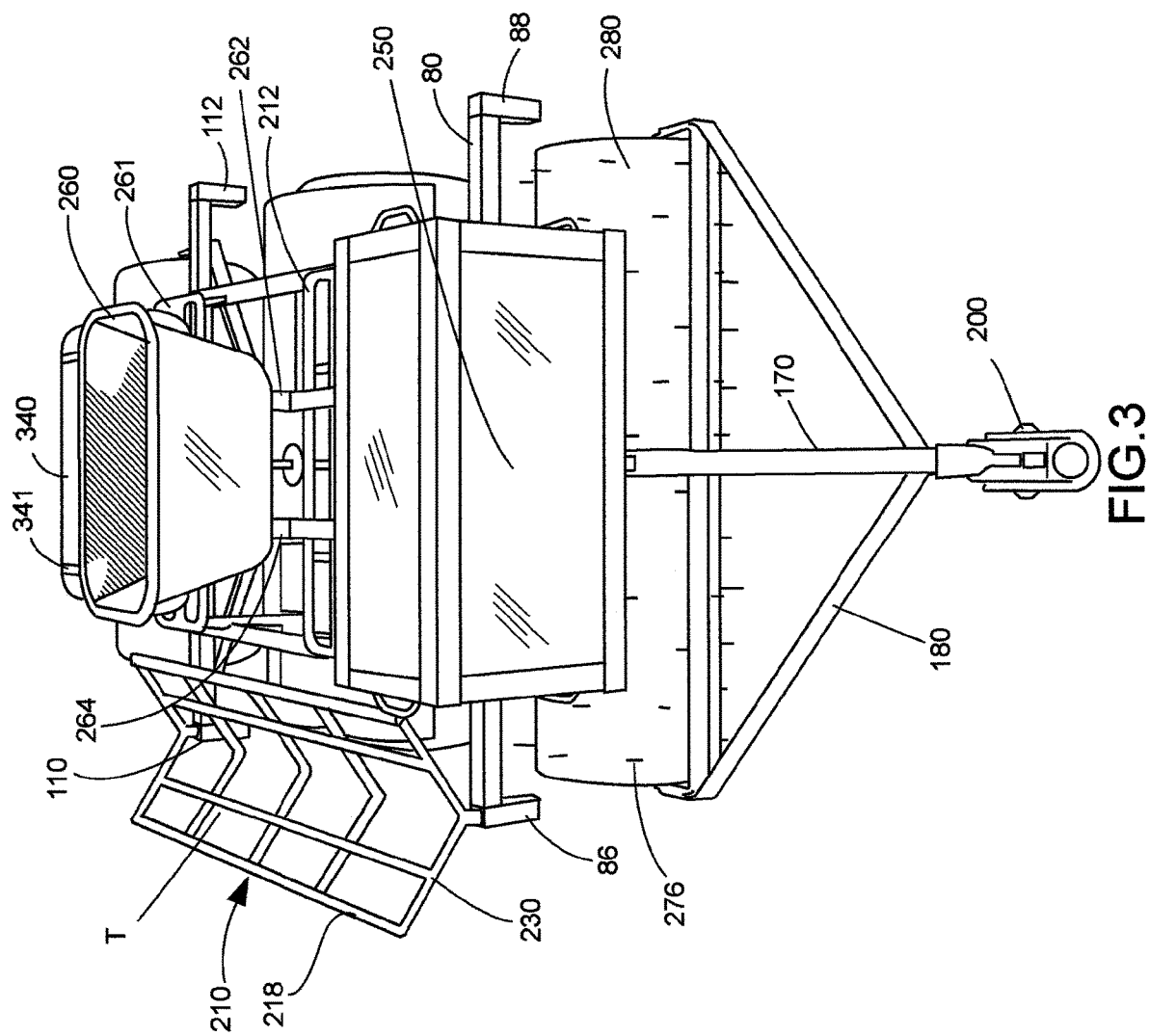
FIG. 3 is a perspective front view of the lawn care trailer system of the invention illustrating additional components which may be carried by the frame assembly of the present invention.

FIGS. 2 through 6 illustrate further arrangements of the lawn care trailer system 10 of FIG. 1. With particular reference to FIGS. 1, 2 and 3, the trailer system 10 further includes a mounting assembly 210 supported on frame assembly 20, and located in first plane 50 (FIG. 1) of frame assembly 20. Mounting assembly 210 includes a first section 212; a second section 214; a third section 216; and a fourth section 218. First section 212 is mounted on first and second longitudinal bars 70, 72 of frame assembly 20 adjacent to first transverse bar 80 of frame assembly 20, and extends in the direction of the transverse axis 40 of frame assembly 20. Second section 214 is mounted on the first and second longitudinal bars 70, 72 of frame assembly 20 adjacent to second transverse bar 100 of frame assembly 20, and extends in the direction of the transverse axis 40 of frame assembly 20. Third section 216 is mounted on first and second longitudinal bars 70, 72 of frame assembly 20 adjacent to third transverse bar 130 and spaced between first section 212 and second section 214. Third section 216 extends in the direction of the transverse axis 40 of frame assembly 20. Fourth section 218 (FIG. 3) is mounted on the first longitudinal bar 70 (FIG. 1) and extends in the direction of the longitudinal axis 38 of frame assembly 20. As can be seen in FIG. 3, fourth section 218 is in a V-shape configuration, and fourth section 218 may be used to support and carry implements, such as tools (not shown).

Still referring particularly to FIGS. 2 and 3, an enclosed storage container 250 is secured through suitable means (not shown) on tow bar 170 of frame assembly 20 (FIG. 1). With particular reference to FIGS. 2 and 3, an open storage container 260 (FIG. 3) is securely mounted on second section 216 of mounting assembly 210 via spaced-apart support bars 262, 264 best shown in FIG. 3. As best shown in FIG. 2, frame assembly 20 is constructed to connect a first roller 270 and a second roller 280. First roller 270 is connected to tubular member 171 of fourth transverse bar 60 of frame assembly 20 (FIG. 1), and second roller 280 may be connected to either the third tubular member 90 of first transverse bar 80 of frame assembly 20, or it may be connected to tubular member 176 of tow bar 170 (FIG. 1). A plurality of ground-aerating spikes, such as that indicated at reference number 276, is arranged on second roller 280.

As shown in FIGS. 2 and 3, a fertilizer storage container 340 is mounted through suitable means 341 on second section 214 of mounting assembly 210 such as to provide a discharge end (not shown) located adjacent to the second end 32 of frame assembly 20.

Figure 4:
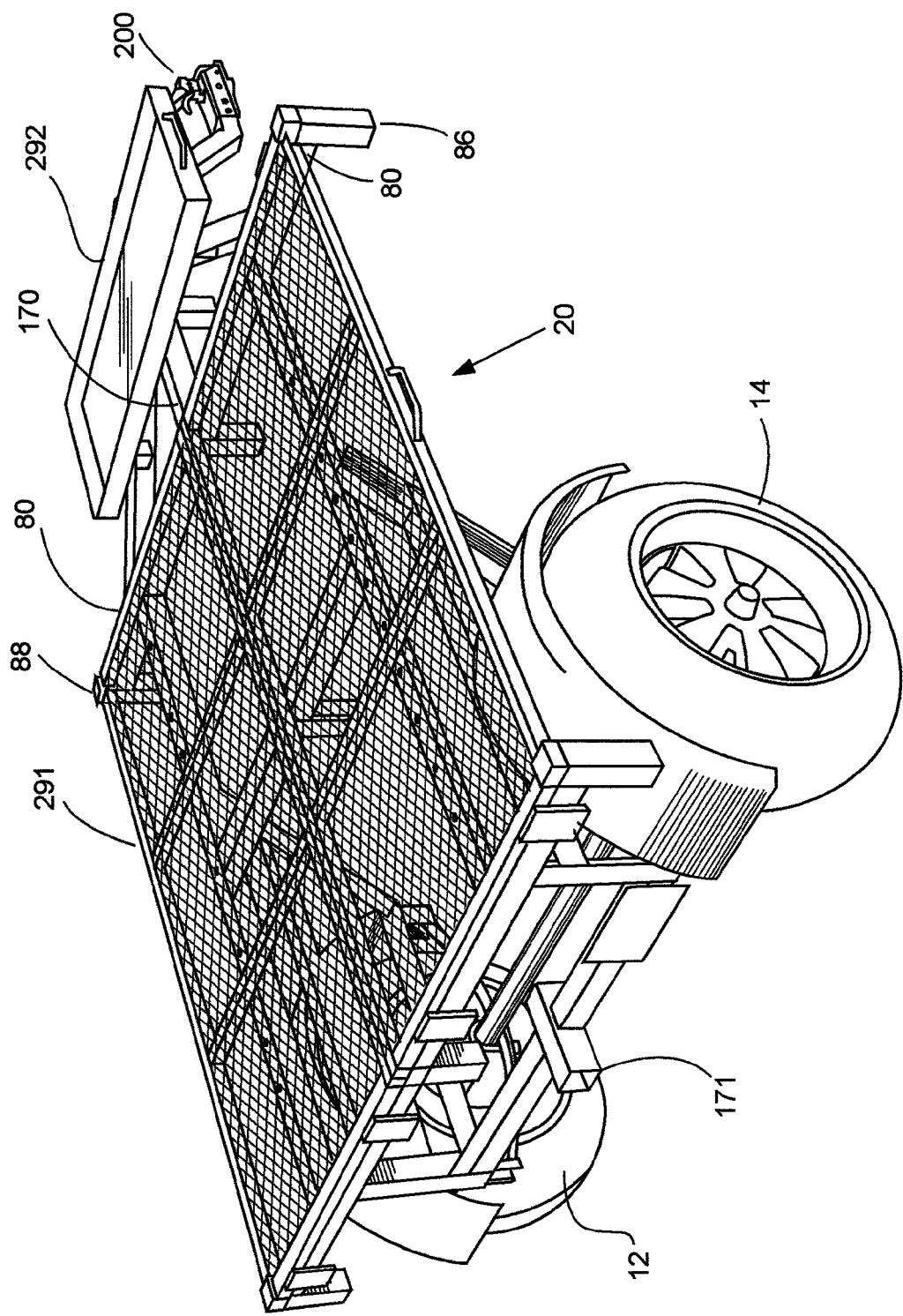
FIG. 4 is a perspective side view of the lawn care trailer system of the invention illustrating a flat screened bed assembly carried by the frame assembly for carrying large trees and bushes for planting.

As shown in FIG. 4, frame assembly 20 is supporting a flat-screened bed assembly 291 which may be used to carry large trees and bushes for planting. In addition, a support platform 292 is mounted on tow bar 170 (FIG. 1) adjacent to first transverse bar 80 of frame assembly 20. This support platform 292 may be used to carry various tools and containers needed during the lawn care operation.

Figure 5:
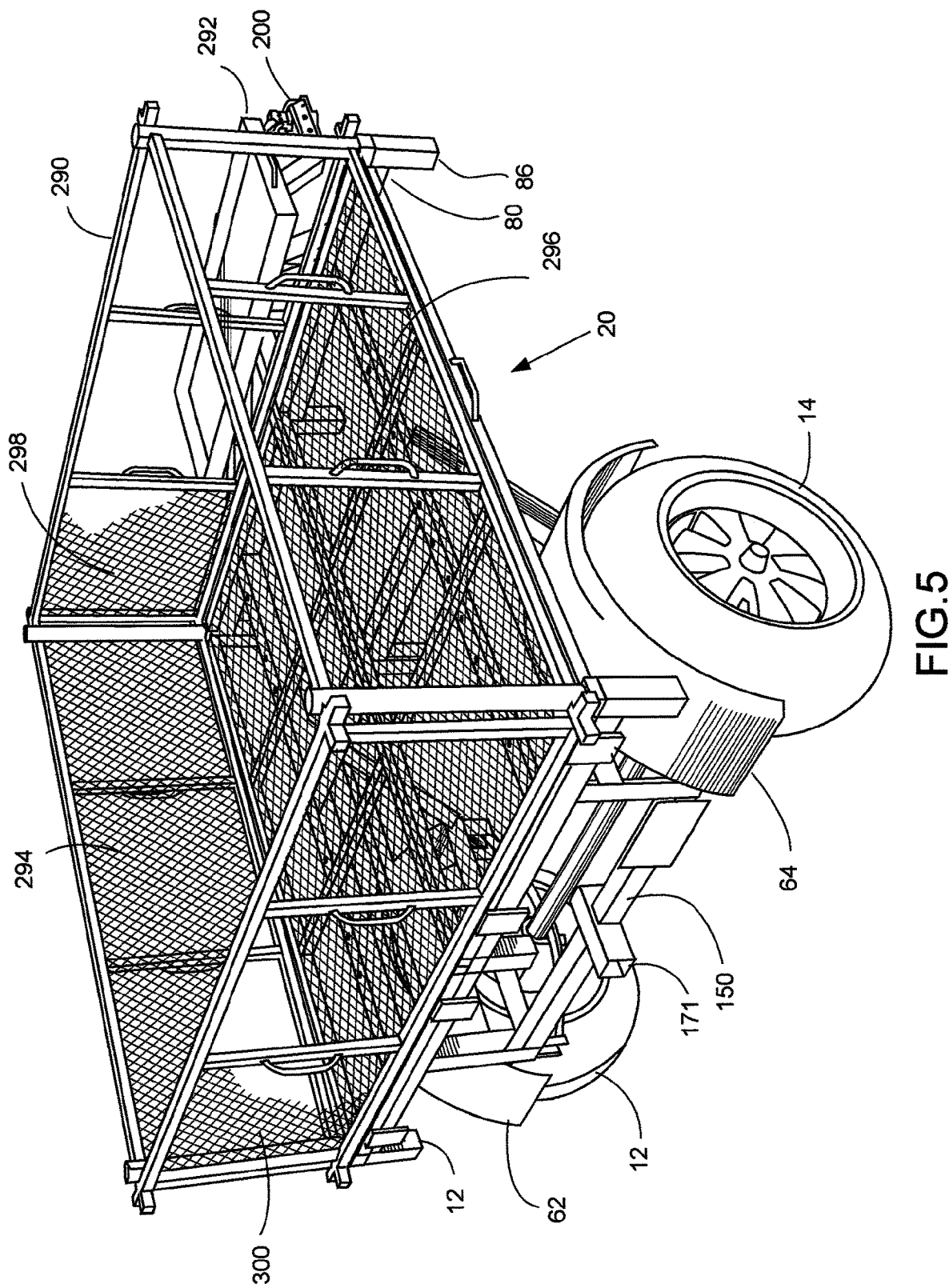
FIG. 5 is a perspective side view of the lawn care trailer system of the invention illustrating a box cart attachment carried by the frame assembly.

As shown in FIG. 5, a box shape support assembly 290 is mounted on frame assembly 20 in the first plane 50 (FIG. 1) thereof and support platform 292 is mounted on the tow bar 170 (FIG. 4) adjacent to the first transverse bar 80 of frame assembly 20. Box shape support assembly 290 further includes side walls 294, 296 and end walls 298, 300. These side walls 294, 296 and end walls 298, 300 may be removably mounted on frame assembly 20. The purpose of the side walls 294, 296 and end walls 298, 300 and the support platform 292 is obvious to those skilled in the art.

Figure 6:
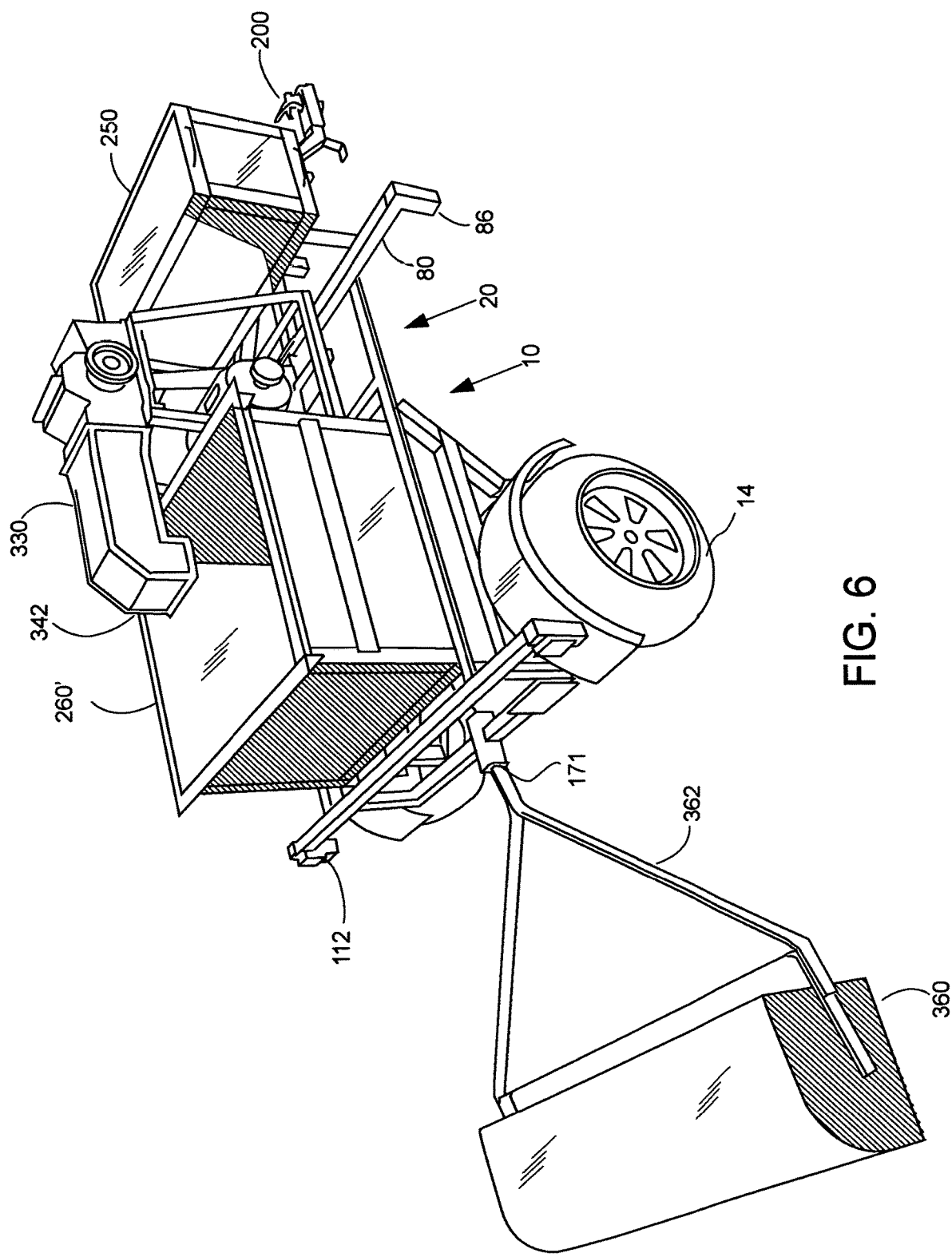
FIG. 6 is a perspective side view of the lawn care trailer system of the invention illustrating additional components which may be carried by the frame assembly of the present invention and which may be referred to as "a fall version" of the invention.

FIG. 6 shows a further lawn care implementation and arrangement involving the frame assembly 20 of the lawn care trailer system 10 of the invention. The configuration of FIG. 6 is generally referred to as "a fall version" of the multi-purpose landscaping and seeding law care trailer system of the invention. This arrangement includes an open container 260'; a rear leaf sweeper attachment 360 connected to tubular member 171 by a frame unit 362; and shredder devices 330 and 342. The rear leaf sweeper attachment 360 is generally used to collect leaves and small twigs. Once the collection container 260' is full, the operator of the system of FIG. 6 may use the attached shredder devices 330, 342 to reduce the collected leaves to mulch size which can then be transported directly to a garden area to be dumped. If an electric shredder is used, it can be plugged into electric outlets (not shown).

A different arrangement for frame assembly 20 supporting various components is shown in FIG. 9. Frame assembly 20 supports a multi-compartment storage unit 350. Unit 350 includes two compartments 352 for carrying fertilizer and/or seed, and a compartment 356, which may contain a generator, a cooler, a radio, a battery, a toolbox, and the like.

Alternative arrangements for the components of the invention are anticipated by the inventor. For example, frame assembly 20 may comprise an open box shape support assembly 290 similar to that shown in FIG. 5 which may contain a cover (not shown) and a first roller 270 and a second roller 280 similar to those shown in FIG. 2.

The arrangements for the lawn care trailer system 10 in FIGS. 2, 3, and 4 show a complete spring set up for trailer system 10. This arrangement allows a user to aerate, seed, fertilize and roll in one pass. Also, if trailer system 10 is towed via connection member 200 by a motorized vehicle, the grass can be cut simultaneously with other processes performed by trailer system 10. This set up will have an electrical option that permits plugging the spreaders into a battery system with a generator backup. This set up may further include side attachments for holding racks, and other tools used in the garden.

While the present invention has been described in connection with preferred embodiments of the various figures, it is to be understood that other similar embodiments may be used or modifications and additions may be made to the described embodiments for performing the same function of the present invention without deviating there from. Accordingly, it is intended by the appended claims to cover all such changes and modifications as come within the spirit and scope of the invention.

What is claimed is:

1. A lawn care trailer system, comprising:
   at least two spaced-apart wheels connected by an axle; and
   a frame assembly supported by the wheels, the frame assembly, comprising:
   a first end, a second end, a first side, a second side, a longitudinal axis extending between the first end and the second end, a transverse axis extending between the first side and the second side, a first plane which is a top plane when the frame assembly is in use, and a second plane which is a bottom plane when the frame assembly is in use;
   a first longitudinal bar extending in the direction of the longitudinal axis from the first end of the frame assembly to the second end of the frame assembly;
   a second longitudinal bar extending in the direction of the longitudinal axis from the first end of the frame assembly to the second end of the frame assembly;
   the first and second longitudinal bars being spaced apart from each other in the direction of the transverse axis and being adjacent to a wheel and defining an side of the frame assembly;
   a first transverse bar located adjacent to the first end of the frame assembly and extending in the direction of the transverse axis of the frame assembly and extending beyond the longitudinal bars, the first transverse bar having a first end located adjacent to the first longitudinal bar, a second end located adjacent to the second longitudinal bar, a first tubular member on the first end of the first transverse bar, a second tubular member on the second end of the first transverse bar, and a third tubular member on the first transverse bar between the first and second longitudinal bars, the tubular members on the first transverse bar extending between the first plane of the frame assembly and the second plane of the frame assembly;
   a second transverse bar located adjacent to the second end of the frame assembly and extending in the direction of the transverse axis of the frame assembly and extending beyond the longitudinal bars, the second transverse bar having a first end located adjacent to the first longitudinal bar, a second end located adjacent to the second longitudinal bar, a first tubular member on the first end of the second transverse bar, a second tubular member on the second end of the second transverse bar, and a third tubular member on the second transverse bar between the first and second longitudinal bars, the tubular members on the second transverse bar extending between the first plane of the frame assembly and the second plane of the frame assembly;
   a third transverse bar extending in the direction of the transverse axis of the frame assembly and being located between the first and second transverse bars, the third transverse bar having a first end fixed to the first longitudinal bar, a second end fixed to the second longitudinal bar, and a tubular member located between the first end of the third transverse bar and the second end of the third transverse bar, the tubular member on the third transverse bar extending between the first plane of the frame assembly and the second plane of the frame assembly;
   a fourth transverse bar extending in the direction of the transverse axis of the frame assembly and being located beneath the second transverse bar, the fourth transverse bar having a first end connected to the second transverse bar, a second end connected to the second transverse bar, a first tubular member located between the first end of the fourth transverse bar and the second end of the fourth transverse bar, the first tubular member on the fourth transverse bar extending in the direction of the longitudinal axis, and
   a tow bar extending in the direction of the longitudinal axis of the frame assembly and having a first end connected to the first transverse bar, a second end spaced away from the first transverse bar, and a tubular member on the tow bar, the tubular member on the tow bar extending between the first plane of the frame assembly and the second plane of the frame assembly.

2. The lawn care trailer system of claim 1, wherein the frame assembly further comprises a tow bar support assembly which includes a first support bar having a first end connected to the first transverse bar of the frame assembly and a second end connected to the tow bar; a second support bar having a first end connected to the first transverse bar of the frame assembly and a second end connected to the tow bar; and a third support bar extending from the tow bar.

3. The lawn care trailer system of claim 2, further including a first storage container mounted on the tow bar.

4. The lawn care trailer system of claim 3, further including a second storage container mounted on the second section of the mounting assembly.

5. The lawn care trailer system of claim 4, further including a third storage container mounted on the third section of the mounting assembly.

6. The lawn care trailer system of claim 2, further including a first roller unit connected to the tubular member on the fourth transverse bar of the frame assembly.

7. The lawn care trailer system of claim 6, further including a second roller unit connected to the frame assembly.

8. The lawn care trailer system of claim 7, further including ground-aerating spikes on the second roller.

9. The lawn care trailer system of claim 1, further including a mounting assembly supported by the frame assembly and located in the first plane of the frame assembly, the mounting assembly comprising:
   a first section mounted on the first and second longitudinal bars adjacent to the first transverse bar of the frame assembly and extending in the direction of the transverse axis of the frame assembly;
   a second section mounted on the first and second longitudinal bars adjacent to the second transverse bar of the frame assembly and extending in the direction of the transverse axis of the frame assembly;
   a third section mounted on the first and second longitudinal bars adjacent to the third transverse bar of the frame assembly and extending in the direction of the transverse axis of the frame assembly; and
   a fourth section mounted on the first longitudinal bar of the frame assembly and extending in the direction of the longitudinal axis of the frame assembly.

10. The lawn care trailer system of claim 9, wherein the fourth section of the mounting assembly is in a V-shape configuration.

11. The lawn care trailer system of claim 1, further including a support assembly mounted on the frame assembly in the first plane and a support platform mounted on the tow bar adjacent to the first transverse bar.

12. The lawn care trailer system of claim 11, wherein the support assembly further includes side walls and end walls.

13. The lawn care trailer system of claim 12, further including a storage receptacle mounted on the frame assembly and a dispensing unit mounted on the frame assembly adjacent to the receptacle.

14. The lawn care trailer system of claim 12, further including a fertilizer storage container mounted on the support unit.

15. A lawn care trailer system, comprising:
a frame assembly, comprising:
a first end, a second end, a first side, a second side, a longitudinal axis extending between the first end and the second end, a transverse axis extending between the first side and the second side, a first plane which is a top plane when the frame assembly is in use, and a second plane which is a bottom plane when the frame assembly is in use;
a first longitudinal bar extending in the direction of the longitudinal axis from the first end of the frame assembly to the second end of the frame assembly;
a second longitudinal bar extending in the direction of the longitudinal axis from the first end of the frame assembly to the second end of the frame assembly;
the first and second longitudinal bars being spaced apart from each other in the direction of the transverse axis;
a first transverse bar located adjacent to the first end of the frame assembly and extending in the direction of the transverse axis of the frame assembly and extending beyond the longitudinal bars, the first transverse bar having a first end located adjacent to the first longitudinal bar, a second end located adjacent to the second longitudinal bar, a plurality of tubular members on the first transverse bar, the tubular members being spaced apart from each other in the direction of the transverse axis of the frame assembly, the tubular members on the first transverse bar extending between the first plane of the frame assembly and the second plane of the frame assembly;
a second transverse bar located adjacent to the second end of the frame assembly and extending in the direction of the transverse axis of the frame assembly and extending beyond the longitudinal bars, the second transverse bar having a first end located adjacent to the first longitudinal bar, a second end located adjacent to the second longitudinal bar, a plurality of tubular members on the second transverse bar, the tubular members on the second transverse bar being spaced apart from each other in the direction of the transverse axis of the frame assembly, the tubular members on the second transverse bar extending between the first plane of the frame assembly and the second plane of the frame assembly;
a third transverse bar extending in the direction of the transverse axis of the frame assembly and being located between the first and second transverse bars, the third transverse bar having a first end fixed to the first longitudinal bar, a second end fixed to the second longitudinal bar, and a tubular member located between the first end of the third transverse bar and the second end of the third transverse bar, the tubular member on the third transverse bar extending between the first plane of the frame assembly and the second plane of the frame assembly;
a fourth transverse bar extending in the direction of the transverse axis of the frame assembly and being located below the second transverse bar, the fourth transverse bar having a first end connected to the second transverse bar, a second end connected to the second transverse bar, a first tubular member located between the first end of the fourth transverse bar and the second end of the fourth transverse bar, the first tubular member on the fourth transverse bar extending in the direction of the longitudinal axis; and
a tow bar extending in the direction of the longitudinal axis of the frame assembly and having a first end connected to the first transverse bar, a second end spaced apart from the first transverse bar, and a tubular member on the two bar, the tubular member on the tow bar extending between the first plane of the frame assembly and the second plane of the frame assembly.

* * * * *